US012697587B2

(12) United States Patent
Merrill et al.

(10) Patent No.: US 12,697,587 B2
(45) Date of Patent: Aug. 4, 2026

(54) ENHANCED DUAL PHASE MEMBRANES FOR SEPARATING CARBON FROM CARBON-CONTAINING FEED GASES AND SEPARATION METHODS USING THE SAME

(71) Applicant: LUNA LABS USA, LLC, Charlottesville, VA (US)

(72) Inventors: Matthew Merrill, Roanoke, VA (US); Jesse Kelly, Roanoke, VA (US)

(73) Assignee: LUNA LABS USA, LLC, Charlottesville, VA (US)

( * ) Notice: Subject to any disclaimer, the term of this patent is extended or adjusted under 35 U.S.C. 154(b) by 541 days.

(21) Appl. No.: 18/021,758

(22) PCT Filed: Aug. 20, 2021

(86) PCT No.: PCT/US2021/046842
§ 371 (c)(1),
(2) Date: Feb. 16, 2023

(87) PCT Pub. No.: WO2022/040500
PCT Pub. Date: Feb. 24, 2022

(65) Prior Publication Data
US 2024/0024822 A1      Jan. 25, 2024

Related U.S. Application Data

(60) Provisional application No. 63/068,081, filed on Aug. 20, 2020.

(51) Int. Cl.
B01D 61/38 (2006.01)
B01D 53/22 (2006.01)
(Continued)

(52) U.S. Cl.
CPC ........... B01D 61/38 (2013.01); B01D 53/228 (2013.01); B01D 69/106 (2022.08);
(Continued)

(58) Field of Classification Search
None
See application file for complete search history.

(56)                References Cited

U.S. PATENT DOCUMENTS 3,216,930 A * 11/1965 Glew ........................ C02F 1/44
23/303
5,820,655 A * 10/1998 Gottzmann ......... C01B 13/0255
96/10
(Continued)

FOREIGN PATENT DOCUMENTS

WO        2017/200764        11/2017
WO        2018/148524        8/2018
WO        2018/237336        12/2018

OTHER PUBLICATIONS

International Search Report dated Dec. 10, 2021, for PCT/US2021/046842, 4 pp.
(Continued)

*Primary Examiner* — John J Figueroa
(74) *Attorney, Agent, or Firm* — NIXON & VANDERHYE P.C.

(57)                ABSTRACT

Dual phase membranes include a porous support providing a solid phase having a matrix of connected pores, and a liquefiable ion transport phase within the pores of the porous support. The ion transport phase is formed of at least one alkali metal hydroxide, and at least one oxide ion transport agent providing a source of ions selected from the group consisting of borate ions, nitrate ions, phosphate ions, vanadate ions, niobate ions or sulfate ions. The at least one alkali metal hydroxide may be selected from the group consisting of NaOH, KOH, LiOH, RbOH, CsOH and mixtures thereof. The oxide ion transport agent is preferably present in the ion transport phase in an amount between about 1 to about 30

(Continued)

molar %. Substantially lower operational temperatures may be realized when the membrane is used to separate CO2 from a feed gas.

28 Claims, 2 Drawing Sheets

(51) Int. Cl.
    B01D 69/10         (2006.01)
    B01D 71/02         (2006.01)

(52) U.S. Cl.
    CPC ......... B01D 69/108 (2022.08); B01D 71/024 (2013.01); *B01D 2257/504* (2013.01)

(56) References Cited

U.S. PATENT DOCUMENTS

| | | | |
|---|---|---|---|
| 10,464,015 B2 | 11/2019 | Worsley et al. | |
| 11,939,686 B2 * | 3/2024 | Campbell | ......... B01D 71/0271 |
| 2015/0090125 A1 * | 4/2015 | Lin | ......... B01D 69/04 |
| | | | 427/244 |
| 2017/0333834 A1 * | 11/2017 | Worsley | ......... B01D 53/82 |
| 2019/0389778 A1 * | 12/2019 | Campbell | ......... B01D 53/025 |
| 2020/0114333 A1 * | 4/2020 | Campbell | ......... B01D 69/14111 |

OTHER PUBLICATIONS

Written Opinion of the ISA dated Dec. 10, 2021, for PCT/US2021/046842, 9 pp.

Maira R. Cerón et al., "Surpassing the conventional limitations of $CO_2$ separation membranes with hydroxide/ceramic dual-phase membranes", Journal of Membrane Science, vol. 567, Sep. 13, 2018, pp. 191-198.

Zebao Rui et al., "Ionic conducting ceramic and carbonate dual phase membranes for carbon dioxide separation", Journal of Membrane Science, vol. 417-418, Jun. 23, 2012, pp. 174-182.

* cited by examiner

ENHANCED DUAL PHASE MEMBRANES FOR SEPARATING CARBON FROM CARBON-CONTAINING FEED GASES AND SEPARATION METHODS USING THE SAME

CROSS-REFERENCE TO RELATED APPLICATIONS

This application is the U.S. national phase of International Application No. PCT/US2021/046842 filed Aug. 20, 2021, which designated the U.S. and is based on and claims priority benefits from U.S. Provisional Application Ser. No. 63/068,081 filed on Aug. 20, 2020, the entire contents of each of which are expressly incorporated hereinto by reference.

GOVERNMENT RIGHTS

This invention was made with Government support under the following Government awarded contracts: Department of Energy under Award Number DE-SC0017124. The Government has certain rights to the invention.

FIELD

The embodiments disclosed herein relate generally to the use of dual-phase separation membranes for the high-performance capture and separation of carbon from feed gases (e.g., flue gas of an industrial facility). Certain embodiments described herein relate to incorporation of oxide ion transfer agents (e.g., borates, nitrates, phosphates, vanadates, niobates, and/or sulfates) into the composition of an ionic liquid (e.g., molten salt) separation phase of the dual phase membranes to enable greater performance and/or to increase the range of temperatures applied for operating the gas separation membranes.

BACKGROUND

Greenhouse gas reduction by means of carbon capture and separation remains a significant challenge for the chemical, petroleum, and power generation industries, and for a low-carbon global economy. Cost effective capture and separation of carbon dioxide ($CO_2$) from any mixture of gases is anticipated to enable the benefits of reduced greenhouse gas emissions by using or sequestration of the captured carbon dioxide.

The economic and energy costs of carbon capture and separation using conventional technologies, such as polymer membranes and solvent-based solutions, are often too high to enable widespread application of cost-effective $CO_2$ capture. New technologies are desired for $CO_2$ separation from gas mixtures that can occur as a part of various industrial processes, including chemical, petroleum, and power plants. For example, conventional polymer membrane-based technologies can be applied to capture the carbon from the exhaust gas of a fossil fuel power plant. Dual phase membranes are an alternative technology that can conventionally capture $CO_2$ at temperatures $\geq 550°$ C. with a molten carbonate phase. (Rui, Z. et al, Ionic conducting ceramic and carbonate dual phase membranes for carbon dioxide separation, *J. Memb. Sci.* 417-418, 174-182 (2012), the entire content of which is expressly incorporated hereinto by reference.)

Molten hydroxides have recently been introduced into the ion separation phase so as to increase $CO_2$ permeation rates and decrease operational temperatures to $\geq 400°$ C. (See, Cerón, M. R. et al. Surpassing the Conventional Limitations of $CO_2$ Separation Membranes with Hydroxide/Ceramic Dual-Phase Membranes, *J. Memb. Sci.* 567, 191-198 (2018), the entire content of which is expressly incorporated hereinto by reference.) By way of example, U.S. Pat. No. 10,464,015 (the entirety of which is expressly incorporated hereinto by reference) has proposed that separation membranes be provided in use with at least one molten alkali metal hydroxide disposed within the pores of a solid porous support structure. The molten separation phase may thus include suitable concentrations of NaOH, KOH, LiOH, RbOH, CsOH and mixtures thereof. When used as a ternary mixture for the separation of $CO_2$ from a flue gas, such a ternary mixture of molten alkali metal hydroxides will thereby provide a molten separation phase within the membrane having average concentrations of KOH, NaOH, LiOH, $K_2CO_3$, $Na_2CO_3$ and/or $Li_2CO_3$ depending on the particular hydroxide species included in the mixture.

The overall process efficiency of using dual phase membranes for post-combustion carbon capture and range of exhaust gas applications, however, would greatly benefit by the ability to operate even at temperatures as low as 125-300° C. It is therefore towards providing such enhancements to dual phase membrane separation of $CO_2$ from a flue gas, e.g., lower operation temperatures, that the embodiments disclosed herein are directed.

SUMMARY

In general, the embodiments of the herein disclosed invention are directed toward enhanced dual phase membranes for separating $CO_2$ from a feed gas which necessarily will include a solid porous support phase providing a porous solid matrix of connected open pores, and a molten salt phase contained within the pores of the solid porous support phase, wherein the liquid phase includes in use at least one molten alkali metal hydroxide and one or more oxide transfer agents dispersed throughout the alkali metal hydroxide. These oxide ion transfer agents can thereby function in the liquid phase to affect gas sorption reactions as an oxide ion transfer catalyst or to control the acid/base equilibrium of oxide ions. Moreover, these oxide ion transfer agents can also chemically couple the permeation of carbon dioxide from the feed gas with the water vapor of a steam sweep to enable an active transport membrane mechanism. This active transport mechanism can thus power carbon dioxide separation with the larger concentration gradients (partial pressure) of water vapor instead of solely relying on the concentration gradients of carbon dioxide to power gas separation by the membrane. In such a manner, therefore, the dual phase active membrane embodiments as described herein enable the high performance separation of $CO_2$ from a feed gas throughout a relatively wide range of relevant applied temperatures and other operational conditions.

According to certain embodiments, the dual phase membrane will include a porous support providing a solid phase having a matrix of connected pores, and a liquefiable ion transport phase within the pores of the porous support, wherein the ion transport phase is formed of at least one alkali metal hydroxide, and at least one oxide ion transport agent providing a source of ions selected from the group consisting of borate ions, phosphate ions, vanadate ions and niobate ions. The at least one alkali metal hydroxide may be selected from the group consisting of NaOH, KOH, LiOH, RbOH, CsOH and mixtures thereof. The oxide ion transport agent is preferably present in the ion transport phase in an amount between about 1 to about 30 molar %.

The ion transport phase in some embodiments may comprise a melt temperature depression component in a molar amount sufficient to depress operational temperatures of the membrane to about 100° C. or above, e.g., from about 100° C. to about 500° C., such as from about 125° C. to about 300° C. The melt temperature depression component may be comprised at least one alkali earth metal hydroxide, at least one alkali metal nitrate and/or at least one alkali earth metal nitrate, for example at least one compound selected from the group consisting of Be(OH)$_2$, Mg(OH)$_2$, Ca(OH)$_2$, Sr(OH)$_2$, Ba(OH)$_2$, LiNO$_3$, NaNO$_3$, KNOB, RbNO$_3$, CsNO$_3$, Be(NO$_3$)$_2$, Mg(NO$_3$)$_2$, Ca(NO$_3$)$_2$, Sr(NO$_3$)$_2$, Ba(NO$_3$)$_2$ and mixtures thereof.

The porous support may be comprised of a metal or ceramic material, such as nickel-chromium based alloys, stainless steels, zirconium oxides, cerium oxides, magnesium oxides, aluminum oxides, lanthanum oxides, samarium oxides, gadolinium oxides, iron oxides, calcium carbonates, silicon oxides and silicon carbides. The pores of the porous support may have an average pore size of about 10 nm up to about 1 mm.

In use so as to separate a gaseous species (e.g., CO$_2$) from a feed gas, a surface of the dual phase membrane may be contacted with a feed gas containing a gaseous species to be separated therefrom at an operational temperature sufficient to render the ion transport phase molten so as to allow the gaseous species to be transported through the molten ion transport phase to an opposite surface of the membrane. The opposite surface of the membrane with a sweep gas, such as steam. In certain embodiments, the concentration of CO$_2$ in the steam sweep gas may be greater than the concentration of CO$_2$ in the feed gas.

These and other aspects of the present invention will become more clear after careful consideration is given to the following detailed description of a presently preferred exemplary embodiment thereof.

BRIEF DESCRIPTION OF THE DRAWINGS

Reference will be made to the accompanying drawing Figures, wherein.

DETAILED DESCRIPTION

Figure 1:
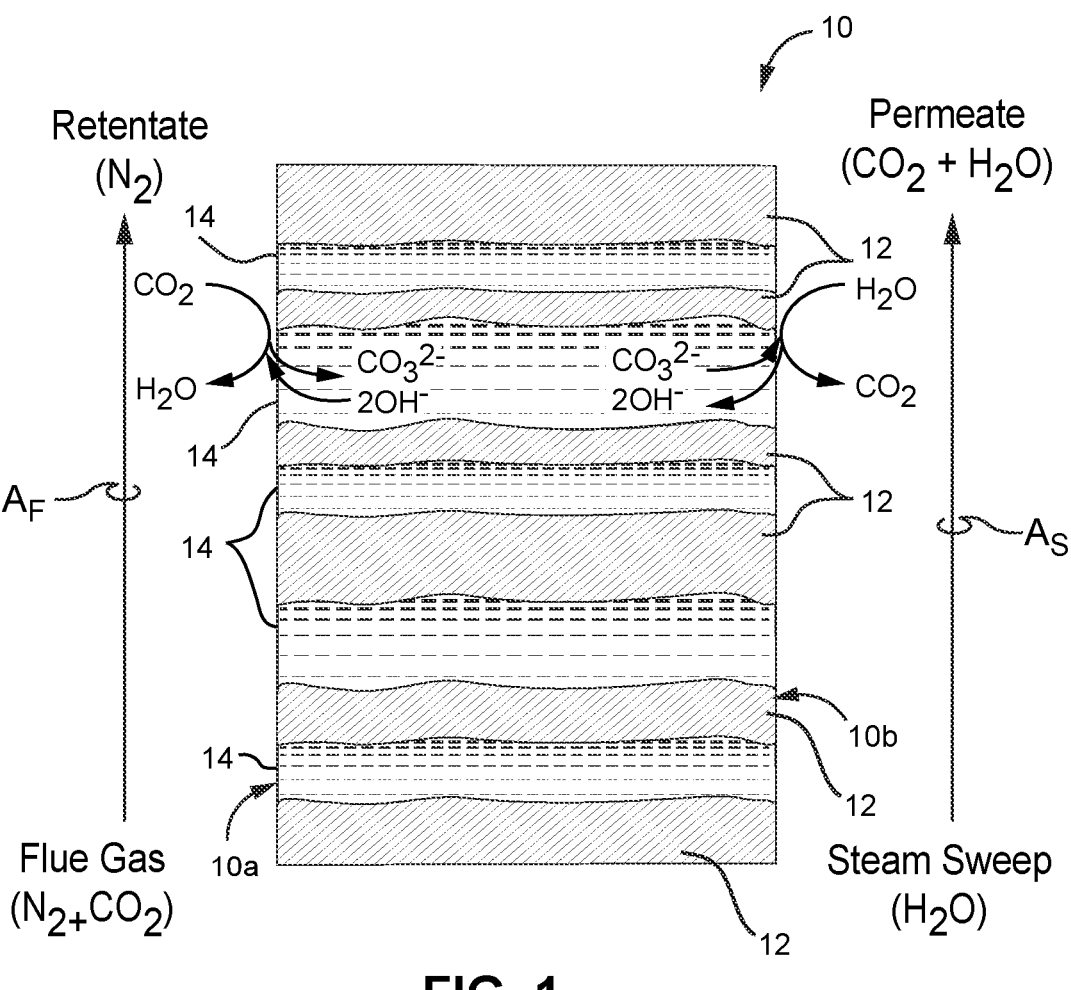
FIG. 1 is a highly schematic cross-sectional view of a dual phase active separation membrane in accordance with an embodiment of the invention described herein.

As used herein and in the accompanying claims, the term "dual phase membrane" means a gas separation membrane that necessarily includes a solid phase and a liquid phase at the operational temperatures of the membrane. As is shown in FIG. 1, a dual phase membrane 10 is provided with a solid phase 12 and a liquid phase 14 at the operational temperatures of the membrane 10. Thus, the solid phase 12 confers a structural form factor to the membrane, provides mechanical support, and establishes a contiguous pore structure that retains the liquid phase with capillary action. The liquid phase 14 is a non-volatile liquid at the operational temperatures of the membrane that selectively transports gases from one side 10a of the membrane (feed gas or retentate side) to the other side 10b of the membrane (sweep gas or permeate side) through absorption, diffusion/conduction, and desorption processes. The carbon dioxide (CO$_2$) in a feed gas (arrow A$_F$) flowing in contact with feed gas side 10a of the membrane 12 will thereby permeate through the liquid phase 14 of the membrane 12 as a carbonate (CO$_3^{2-}$), bicarbonate (HCO$_3$-), or related ionic species and be captured in the sweep gas (arrow A$_S$), typically steam, flowing in contact with the sweep gas side 10b of the membrane 12.

The specifics of the solid and liquid phases will be described in greater detail hereinbelow.

A. Porous Support/Solid Phase

The porous support or solid phase 12 of the dual phase membrane according to the embodiments disclosed herein may be virtually any solid porous structure that can be employed in solid phase/liquid phase membranes at their operational temperature and pressure conditions. Thus, for example, the porous support or solid phase 12 may be formed of a suitable metal or ceramic material that is capable of withstanding the operational temperatures and pressure gradients in the system with which the dual phase membrane is to be used (e.g., temperatures of up to about 700° C.). For example, the porous support or solid phase 12 may comprise a porous metal or metal aerogel formed of or comprising Inconel® nickel-chromium based superalloys, stainless steels (e.g., grade 316 SS), and the like as well as porous ceramics or ceramic aerogels formed of or comprising zirconium oxide, cerium oxide, magnesium oxide, aluminum oxide, lanthanum oxides, samarium oxides, gadolinium oxides, iron oxides, calcium carbonates and silicon oxides or carbides.

Regardless of the material from which it is formed, the solid phase 12 will define numerous connected open cell pores thereby establishing a continuous tortuous path from one side or face 10a of the solid phase 12 to the other opposite side or face 10b thereof. The pores may have substantially the same average diameters throughout the thickness of the solid phase. Alternatively, the pores may have varying pore size throughout the cross-sectional thickness of the solid phase 12. For example, for those embodiments that employ a pore size gradient, the pores having a relatively larger pore size may be located in regions of the solid phase 12 in proximity to one of the two outer faces 10a, 10b thereof such that the pores having a relatively smaller pore size may be located on the opposite face.

The particular pore size employed is not critical and the selection of any specific pore size(s) will be dependent on a number of operational factors well known to the skilled person in this art, including the operational temperature conditions and pressure gradients (if any) employed during use which in turn will impart stress to the solid phase. The solid phase may therefore advantageously be provided with pore sizes that range from about 1 nm up to about 100 μm, for example, from about 3 nm to about 10 μm, or from about 10 nm to about 1 μm or even from about 30 nm to about 300 nm.

The thickness of the solid phase 12 and hence the thickness of the membrane can likewise be selected so as to withstand the temperature and pressure conditions of the membrane during use and to facilitate the mass transport through the membrane. Thus, the solid phase (and hence the membrane itself) can have a thickness of between about 30 μm to about 1 cm, advantageously between about 100 μm to about 3 mm, e.g., from about 300 μm to about 1 mm.

B. Ion Transport (Liquefiable) Phase

As noted previously, the ion transport phase 14 will be contained within the pores of the solid porous support phase 12. According to the embodiments disclosed herein, the ion transport phase 14 will necessarily be molten (liquefied) at the operational temperature conditions of the membrane 10, e.g., at temperatures of 100° C. or greater, typically at temperatures of 125° C. or greater. In use, therefore, the ion transport phase 14 will include at least one molten alkali metal hydroxide and one or more oxide transfer agents dispersed throughout the alkali metal hydroxide.

Molten alkali metal hydroxides may in practice be one or more molten alkali metal hydroxides selected from the group consisting of NaOH, KOH, LiOH, RbOH, CsOH and mixtures thereof. Preferably, mixtures of the alkali metal hydroxides will be eutectic such that the entire mixture melts as a whole as opposed to individual components melting individually under different conditions such as temperature and pressure at the lowest possible melting temperature over all possible mixing ratios for the involved species.

The operational temperatures of the membrane 10 may be lowered further, e.g., to as low as about 125° C. or even as low as about 100° C., by the addition of melt temperature depression components to the ion transport phase 14 that lower the melting temperature by solvation or dilution effects. Such preferred melt temperature depression components may, for example, be alkali earth metal hydroxides such as, for example, $Be(OH)_2$, $Mg(OH)_2$, $Ca(OH)_2$, $Sr(OH)_2$, $Ba(OH)_2$ and mixtures thereof. Further, alkali and alkali earth metal nitrates, such as $LiNO_3$, $NaNO_3$, $KNO_3$, $RbNO_3$, $CsNO_3$, $Be(NO_3)_2$, $Mg(NO_3)_2$, $Ca(NO_3)_2$, $Sr(NO_3)_2$, $Ba(NO_3)_2$ and mixtures thereof can also be added to the molten alkali metal hydroxides of the ion transport phase 14 to establish a lower melting temperature molten liquid for $CO_2$.

One technical challenge with achieving $CO_2$ separation at the low temperatures of between about 125° C. to about 300° C. is associated with $CO_2$ absorption by the molten hydroxides of the ion transport phase 14. The conversion of alkali and alkali earth metal hydroxides to alkali and alkali earth metal carbonates through $CO_2$ absorption is, however, strongly favored thermodynamically. A characterizing feature of the embodiments disclosed herein therefore is the inclusion of oxide ion transfer agents that catalyze or buffer the oxide ion transfer reactions associated with the absorption, diffusion, and desorption of $CO_2$ for transport through the ion transport phase 14 of the membrane 10 as carbonate-based species.

The herein disclosed embodiments will therefore also necessarily include such oxide ion transfer agents in addition to the molten alkali metal hydroxide and/or molten alkali metal hydroxide-nitrate based liquid phases. The oxide ion transfer agents may therefore be provided by virtually any compound that provides in use a source of anions selected from the group consisting of borate ions, nitrate ions, phosphate ions, vanadate ions, niobate ions and/or sulfate ions. Preferred oxide ion transfer agents therefore may be alkali metal borates, nitrates, phosphates, vanadates, niobates and/or sulfates. The oxide ion transfer agents employed herein will therefore possess favorable solubilities at relevant low temperatures, suitable Lux-Flood acid/base chemistry regarding $O^{2-}$ ions, $CO_2$ absorption and desorption catalytic effects, and other effects that enhance $CO_2$ permeation rates. In general, these oxide ion transfer agents will be dispersed throughout the liquid phase.

The oxide ion transfer agents of borates, nitrates, phosphates, vanadates, niobates and/or sulfates will typically be present in the ion transport (liquefiable) phase in a molar amount of between about 1 to about 30 molar %, typically between about 4 to about 20 molar %, and most preferably between about 8 molar % to about 16 molar %.

C. Separation Processes

As discussed briefly above, the molten salt of the liquid phase selectively sorbs and transports target gases across the membrane 10. For example, in the separation of carbon dioxide from gas mixtures, the $CO_2$ is generally absorbed as the $CO_3^{2-}$ ion through $CO_2 + O^{2-} \rightarrow CO_3^{2-}$, although polycarbonate, bicarbonate, and other species related to the carbonate state may also exist under various conditions. As $CO_3^{2-}$ is transported from one side 10a of the membrane 10 to the other side 10b and then desorbed as $CO_2$, the $O^{2-}$ ions need to be transported through some mechanism in the opposite direction to maintain mass and charge balance across the membrane 10.

Since molten salts based on hydroxides and carbonates are among the fastest conductors of ions through the condensed (solid or liquid) phase at a given temperature, the dual phase membranes can now achieve significantly improved separation properties in terms of permeability and selectivity in comparison with all other currently known membrane proposals in this art. Properly designed, prepared, and operated dual phase membranes in accordance with the embodiments disclosed herein may achieve selectivities of >1,000 for $CO_2$ over relatively inert gases, such as nitrogen ($N_2$), oxygen ($O_2$), and argon (Ar).

The operation of dual phase membranes 10 in accordance with the embodiments disclosed herein may advantageously be used in combination with a steam sweep. The steam is used to sweep the $CO_2$ from the permeate side 10b of the membrane 10, which facilitates additional $CO_2$ permeation by lowering the $CO_2$ concentration in the permeate. In some cases, the presence of $H_2O$ can enhance $CO_2$ permeation through chemical effects. If the dual phase membrane is dependent on the counter current transport of $CO_3^{2-}$ and $OH^-$ through the equilibrium reaction of $K_2CO_3 + H_2O \leftrightarrow 2 KOH + CO_2$, then the steam can help balance the ratio of carbonate to hydroxide so that neither the $CO_3^{2-}$ nor $OH^-$ concentrations in the liquid phase are too low to significantly limit separation rates. In some cases, the coupling of $CO_2$ and $H_2O$ gas absorption and $CO_3^{2-}$ and $OH^-$ transport may enable the newly disclosed advancement to an active transport membrane mechanism. A membrane active transport mechanism uses the coupled transport of a high-concentration species ($H_2O$ of the steam) to thermodynamically force or accelerate the membrane separation of a lower concentration species ($CO_2$ of the flue gas).

Thermodynamics theoretically could drive $CO_2$ permeation until the ratio of $CO_2$ to $H_2O$ in the steam sweep matches the ratio of $CO_2$ to $H_2O$ in the feed gas, however, this ratio may be lower in practice. For example, the exhaust of nearly complete natural gas combustion has a ratio of about 1 $CO_2$ per 2 $H_2O$ and so the composition of the steam sweep could approach a 1 $CO_2$ per 2 $H_2O$ ratio. At a minimum, any concentration of $CO_2$ in the steam sweep greater than the concentration of $CO_2$ in the feed gas would be sufficient to demonstrate the existence of an active transport mechanism. The temperature of the $CO_2$-rich steam sweep can be lowered to induce the subsequent separation of $CO_2$ and $H_2O$ by condensing the steam to water. Depending on how the dual phase membranes as disclosed herein and steam sweep are integrated into a power plant or other source of $CO_2$, carbon can be captured with capital and operating (e.g. energy) costs that are significantly lower than state of the art carbon capture technologies.

As briefly noted above, the operational temperatures of conventional dual phase membranes for carbon capture were initially limited to temperatures 550° C. because of the thermal requirements for solid oxide ion conduction. The incorporation of alkali metal hydroxides and steam sweeps lowered the operational temperatures to $\geq 400°$ C., which generally corresponds to the temperature that ternary eutectic of $(Li_{43.5}Na_{31.5}K_{25})_2CO_3$ freezes when the hydroxides of the electrolyte fully convert to carbonate. The dual phase membrane does function at relevant levels when the liquid phase partially or completely freezes and mass transfer through the liquid phase is inhibited. The Lux-Flood acid/base equilibria must be buffered or otherwise controlled at lower temperatures to keep the liquid phase liquidous temperature below the operational temperature by limiting how much hydroxide is converted to carbonate.

The target high permeation performances and low operational temperatures have not been achievable solely with other combinations of alkali metal ($Li^+$, $Na^+$, $K^+$, $Rb^+$, $Cs^+$) hydroxides. As noted above, in some cases, alkali earth metal ($Be^{2+}$, $Mg^{2+}$, $Ca^{2+}$, $Sr^{2+}$, and $Ba^{2+}$) hydroxides can be incorporated in mixtures with alkali metal hydroxides and alkali metal hydroxide-nitrate mixtures so as to lower operational temperatures. For example, a liquid phase based on a mixture of barium, sodium, and potassium can enable membrane operational temperatures of $\geq 300°$ C. In such cases, an $O^{2-}$ ion catalyst can improve gas separation rates by bypassing the kinetic barriers of $CO_2$ absorption at the lower operational temperatures. An $O^{2-}$ ion buffering agent is needed to control the extent of hydroxide conversion to carbonate through Lux-Flood acid/base equilibria so that the carbonate concentration is great enough to support high $CO_2$ permeation rates, but not high enough to increase the liquid phase liquidous temperature above the operational temperature. A suitable $O^{2-}$ ion buffering agent will likely also perform the catalytic $O^{2-}$ ion transfer effects if it can dissolve in molten hydroxides and hydroxide-nitrate systems at a few mol % or greater concentrations without significantly increasing the liquidous temperature.

A more advanced compliment of liquid phase components and additives are needed to catalyze $O^{2-}$ transfer and adapt the Lux-Flood acid/base equilibria for a given operational temperature. The embodiments disclosed herein therefore embrace the relevant ranges of electrolyte compositions suitable for various carbon capture applications. As previously discussed, compounds providing sources of ions selected from the group consisting of borates, nitrates, phosphates, vanadates, niobates, and sulfates may be added to the ion transport (liquid) phase of the dual phase membrane as oxide ion transfer agents to improve performance or function. The liquid phase will therefore be based on a solvent of molten hydroxides and/or nitrates that will include a concentration of carbonates during the course of operation or use.

The liquid phase may also include significant concentrations of nitrates or sulfates either through formulation or through use upon exposure to feed gases that also include nitrogen oxide or sulfur oxide gases. Aside from using the alkali metal and alkali earth metal cations to manage the liquid phase melting temperatures and acid/base effects, anions of borates, nitrates, phosphates, vanadates, niobates and/or sulfates are added to control the $O^{2-}$ catalytic effects and Lux-Flood acid/base equilibria for optimal $CO_2$ sorption via $CO_2 + O^{2-} \leftrightarrow CO_3^{2-}$. These components are sufficiently soluble in molten hydroxide and nitrate solvents and affect oxide ion transfer and equilibria through the meta, ortho, and pyro (or related poly) states. For example, metaphosphate $(PO_3-)$ accepts oxide ions to form orthophosphate $(PO_4^{3-})$ or pyrophosphate $(P_2O_7^{4-})$ according to $PO_3- + O^{2-} \leftrightarrow PO_4^{3-}$ and $PO_4^{3-} \leftrightarrow P_2O_7^{4-} + O^{2-}$, respectively. Vanadates and niobates undergo the same reactions as phosphates under slightly more acidic conditions. Boron undergoes analogous reactions where metaborate $(BO_2-)$ accepts oxide ions to form orthoborate $(BO_3^{3-})$ or pyroborate $(B_2O_5^{4-})$ according to $BO_2- + O^{2-} \leftrightarrow BO_3^{3-}$ and $2\ BO_3^{3-} \leftrightarrow B_2O_5^{4-} + O^{2-}$, respectively. The performance of the membrane is typically improved when two catalysts are paired together in similar concentrations. This result may indicate that one catalyst is enhancing $CO_2$ adsorption while the other catalyst is enhancing $CO_2$ desorption. Alternatively, this enhancement may occur due to an interaction of the two catalysts, such as $PO_4^{3-} + VO_4^{3-} \leftrightarrow PVO_7^{4-} + O^{2-}$. These reactions should be considered representative and may be more complicated by the actual presence of $CO_2$ and $H_2O$ in the molten phase.

The oxide ion transfer agents can be incorporated into the liquid phase formulation through various combinations of ingredients to achieve the meta, ortho, and pyro (or related poly) states in the final formulation. The selection of ingredients may be dependent on commercial availability, costs, cation pairing, or other factors. For example, sodium borate is commercially available as sodium metaborate, $NaBO_2$, and borax, $Na_2B4O_7 \cdot 10H_2O$. These borates can react with the hydroxides in the formulation to form sodium orthoborate, $Na_3BO_3$, through the following representative reactions of $NaBO_2 + 2\ NaOH \leftrightarrow Na_3BO_3 + H_2O$ or $Na_2B_4O_7 \cdot 10H_2O + 10\ NaOH \leftrightarrow 4\ Na_3BO_3 + 15\ H_2O$. Similarly, trisodium orthophosphate, $Na_3PO4$, could be the initial ingredient or it could be formed by reacting monosodium orthophosphate, $NaH_2PO_4$, or disodium orthophosphate, $Na_2HPO_4$, with excess hydroxide in the formulation through the representative reactions of $NaH_2PO_4 + 2\ NaOH \leftrightarrow Na_3PO_4 + 2\ H_2O$ or $Na_2HPO_4 + NaOH \leftrightarrow Na_3PO_4 + H_2O$. Alternatively, sodium metaphosphate, $NaPO_3$, may be formed through the dehydration of monosodium orthophosphate according to $NaH_2PO_4 \leftrightarrow NaPO_3 + H_2O$. Vanadates, niobates, and nitrates are expected to undergo the same or similar reactions described for the phosphates. These reactions will be dependent on the specific compositions and concentrations of the formulations, the temperatures that the liquid phase has been processed, and other factors.

Further advantages and aspects of the embodiments of this invention will become clearer after consideration is given to the following non-limiting Examples.

EXAMPLES

Several liquefiable ion transport phase compositions identified in Table 1 below were formulated and incorporated into a porous solid phase consisting of a nanoporous zirconia ceramic tube. The porous zirconia ceramic tube were procured from Media and Process Technology Inc. of Pittsburgh, PA having a wall thickness of about 1 mm, an inside diameter of about 5 mm, and a porosity of about 25-35% with a pore size distributed around 100 nm.

TABLE 1

| LIQUID PHASE COMPONENT | EXAMPLE (mol. %) | | | | | | | |
|---|---|---|---|---|---|---|---|---|
| | CE1 | CE2 | E1 | E2 | E3 | E4 | E5 | E6 |
| $Li_2CO_3$ | 43 | | | | | | | |
| $NA_2CO_3$ | 32 | | | | | | | |
| $K_2CO_3$ | 25 | | | | | | | |
| LiOH | | | 43 | 43 | | | 24 | 12 | 34 |
| NaOH | | | 32 | 32 | 30 | 30 | | 36 |

9

TABLE 1-continued

| LIQUID PHASE COMPONENT | EXAMPLE (mol. %) | | | | | | | |
|---|---|---|---|---|---|---|---|---|
| | CE1 | CE2 | E1 | E2 | E3 | E4 | E5 | E6 |
| KOH | | 25 | 20 | 30 | 25 | | 24 | |
| KH$_2$PO$_4$ | | | 5 | | | | 4 | |
| BaOH$_2$ | | | | 40 | 40 | | | |
| KVO$_3$ | | | | | 5 | | 4 | |
| LiNO$_3$ | | | | | | 24 | | 38 |
| NaNO$_3$ | | | | | | | | 4 |
| KNO$_3$ | | | | | | 12 | | |
| CsNO$_3$ | | | | | | 16 | | 12 |
| Li$_3$PO$_4$ | | | | | | 8 | | |
| CsOH | | | | | | | 20 | |
| KBO$_2$ | | | | | | | | 12 |

Membranes with the CE2 and E1-E6 liquid phase compositions identified in Table 1 above were exposed to a feed gas comprised of 5 vol % CO$_2$ and 95 vol % N$_2$ at a flow rate of 200 sccm and a sweep gas comprised of 50 vol % H$_2$O and 50 vol % Ar at a flow rate of 200 sccm. Both the feed gases and sweep gases were applied at near-ambient pressures of 0-3 PSIG and temperatures ranging from 200-500° C. The conditions of the CE1 membrane tested by Rui, Z. et al publication cited above (*J. Memb. Sci.* 417-418, 174-182 (2012)) are described in detail within such reference. The CO$_2$ permeability (mol/m·s·Pa) was determined by measuring the CO$_2$ concentration in the sweep gas using a non-dispersive infrared (NDIR) sensor from CO2meter.com under steady state conditions and factoring the membrane surface area, membrane thickness, and the temperature (15-17° C.) and pressure (0.3 PSIG) of the sweep gas fed to the CO$_2$ sensor after the water was removed from the sweep gas with condensation. The CO$_2$ permeability results are shown in FIG. 2 as a function of various different membrane operating temperatures.

Figure 2:
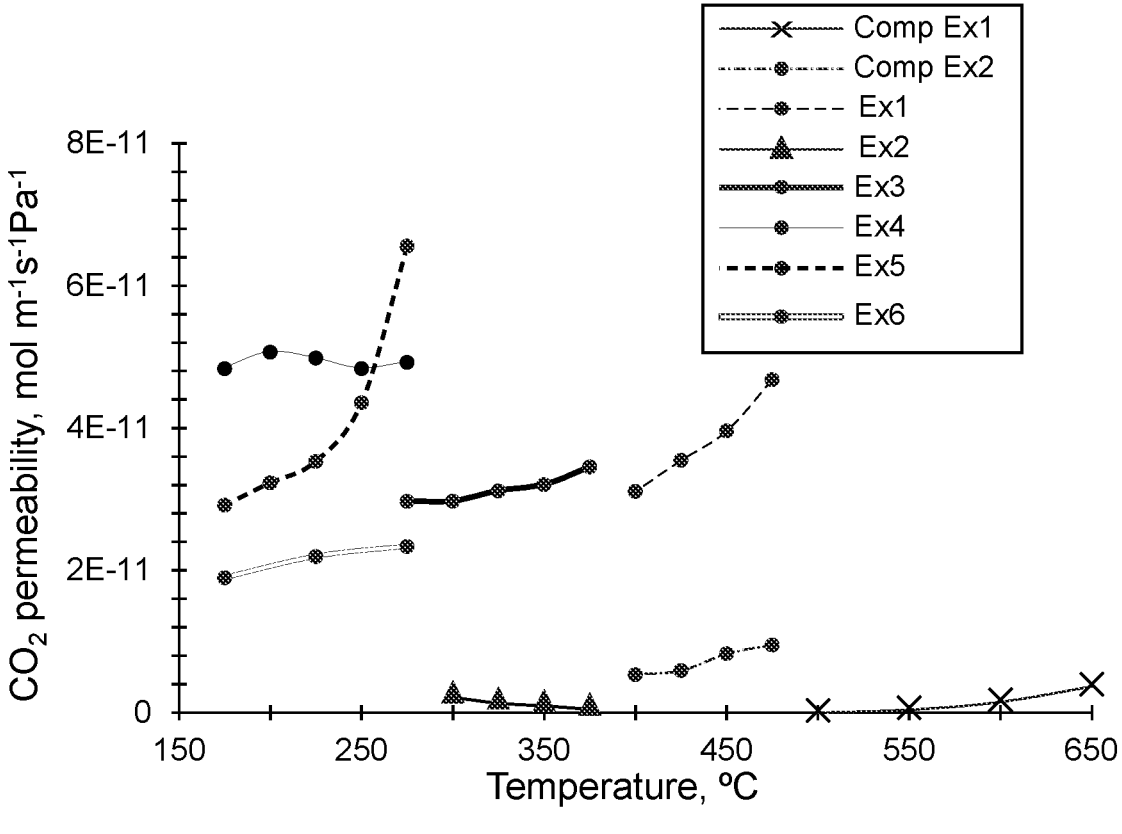
FIG. 2 is a graph plotting CO$_2$ permeability (mol/m·s·Pa) through dual phase membranes versus temperature (° C.) using various liquid phases in accordance with the prior art (Comparative) and in accordance with certain specific embodiments of the invention as described in the Examples below.

As can be seen in FIG. 2, the presence of oxide ion transfer agents, e.g., nitrates, phosphates, vanadates, borates, and niobates, in combination with one or more alkali metal hydroxides significantly improves the CO$_2$ permeation rates through the membrane while also significantly lowering the range of operational temperatures.

It will be appreciated by those skilled in this art that the specific liquid phase components are degenerate in that different combinations of components can yield the same final molar composition of the liquid phase. For example, homogenously mixing one mole of sodium hydroxide (NaOH) with one mole of potassium nitrate (KNOB) will yield the exact same liquid phase composition as mixing one mole of potassium hydroxide (KOH) with one mole of sodium nitrate (NaNO$_3$). While Table 1 describes the representative ingredients used to prepare the liquifiable phase formulation for the Examples provided herein, such ingredients are intended to be exemplary only and thus non-limiting to the disclosed embodiments herein. Thus it is to be understood that the disclosed embodiments herein concern the mixed formulations and are thereby not limited to only the representative lists of components identified in Table 1 that can achieve the net formulation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

10

What is claimed is:

1. A dual phase separation membrane having an operational temperature within a range of 100° C. to 500° C., wherein the membrane comprises:
   a porous support providing a solid phase having a matrix of connected pores; and
   a liquefiable ion transport phase which is molten at the operational temperature within the pores of the porous support, wherein the ion transport phase comprises:
      (i) at least one alkali metal hydroxide, and
      (ii) at least one oxide ion transport agent providing a source of ions selected from the group consisting of alkali and alkaline earth metal salts of vanadate present in the ion transport phase in an amount between 1 to 30 molar %.

2. The dual phase membrane according to claim 1, wherein the at least one alkali metal hydroxide is selected from the group consisting of NaOH, KOH, LiOH, RbOH, CsOH and mixtures thereof.

3. The dual phase membrane according to claim 1, wherein the ion transport phase further comprises a melt temperature depression component in a molar amount sufficient to depress operational temperatures of the membrane to about 100° C. or above.

4. The dual phase membrane according to claim 3, wherein the melt temperature depression component comprises at least one alkali earth metal hydroxide, at least one alkali metal nitrate and/or at least one alkali earth metal nitrate.

5. The dual phase membrane according to claim 4, wherein the melt temperature depression component comprises at least one compound selected from the group consisting of Be(OH)$_2$, Mg(OH)$_2$, Ca(OH)$_2$, Sr(OH)$_2$, Ba(OH)$_2$, LiNO$_3$, NaNO$_3$, KNO$_3$, RbNO$_3$, CsNO$_3$, Be(NO$_3$)$_2$, Mg(NO$_3$)$_2$, Ca(NO$_3$)$_2$, Sr(NO$_3$)$_2$, Ba(NO$_3$)$_2$ and mixtures thereof.

6. The dual phase membrane according to claim 1, wherein the membrane has an operational temperature within a range of about 125° C. to about 300° C.

7. The dual phase membrane according to claim 1, wherein the porous support is comprised of a metal or ceramic material.

8. The dual phase membrane according to claim 7, wherein the porous support is comprised of at least one material selected from the group consisting of nickel-chromium based alloys, stainless steels, zirconium oxides, cerium oxides, magnesium oxides, aluminum oxides, lanthanum oxides, samarium oxides, gadolinium oxides, iron oxides, calcium carbonates, silicon oxides and silicon carbides.

9. The dual phase membrane according to claim 1, wherein the pores have an average pore size of about 10 nm up to about 1 mm.

10. A process to separate a gaseous species from a feed gas, the process comprising:
   (a) contacting a surface of the dual phase membrane according to claim 1 with a feed gas containing a gaseous species to be separated therefrom at the operational temperature within a range of 100° C. to 500° C. sufficient to render the ion transport phase molten; and
   (b) allowing the gaseous species to be transported through the molten ion transport phase to an opposite surface of the membrane.

11. The process according to claim 10, wherein the feed gas comprises a concentration of CO$_2$.

12. The process according to claim 10, which further comprises contacting the opposite surface of the membrane with a sweep gas.

13. The process according to claim 12, wherein the sweep gas is steam.

14. The process according to claim 13, wherein the steam sweep gas results in a $CO_2$ concentration in the steam sweep gas exiting the membrane that is greater than a concentration of $CO_2$ in the feed gas.

15. The process according to claim 10, wherein the at least one alkali metal hydroxide is selected from the group consisting of NaOH, KOH, LiOH, RbOH, CsOH and mixtures thereof.

16. The process according to claim 10, wherein steps (a) and (b) are practiced at an operational temperature within a range of about 125° C. to about 300° C.

17. The process according to claim 10, wherein the ion transport phase further comprises a melt temperature depression component in a molar amount sufficient to depress operational temperatures of the membrane to about 100° C. or above.

18. The process according to claim 17, wherein the melt temperature depression component comprises at least one alkali earth metal hydroxide, at least one alkali metal nitrate and/or at least one alkali earth metal nitrate.

19. The process according to claim 18, wherein the melt temperature depression component comprises at least one compound selected from the group consisting of $Be(OH)_2$, $Mg(OH)_2$, $Ca(OH)_2$, $Sr(OH)_2$, $Ba(OH)_2$, $LiNO_3$, $NaNO_3$, $KNO_3$, $RbNO_3$, $CsNO_3$, $Be(NO_3)_2$, $Mg(NO_3)_2$, $Ca(NO_3)_2$, $Sr(NO_3)_2$, $Ba(NO_3)_2$ and mixtures thereof.

20. A dual phase separation membrane comprising:

a porous support providing a solid phase having a matrix of connected pores; and a liquefiable ion transport phase within the pores of the porous support, wherein the ion transport phase comprises:

(i) at least one alkali metal hydroxide, (ii) at least one oxide ion transport agent providing a source of ions selected from the group consisting of borates, nitrates, phosphates, vanadates, niobates, and sulfates, and (iii) a melt temperature depression component in a molar amount sufficient to depress operational temperatures of the membrane to about 100° C. or above, wherein the melt temperature depression component comprises at least one alkali earth metal hydroxide, at least one alkali metal nitrate and/or at least one alkali earth metal nitrate.

21. The dual phase membrane according to claim 20, wherein the melt temperature depression component comprises at least one compound selected from the group consisting of $Be(OH)_2$, $Mg(OH)_2$, $Ca(OH)_2$, $Sr(OH)_2$, $Ba(OH)_2$, $LiNO_3$, $NaNO_3$, $KNO_3$, $RbNO_3$, $CsNO_3$, $Be(NO_3)_2$, $Mg(NO_3)_2$, $Ca(NO_3)_2$, $Sr(NO_3)_2$, $Ba(NO_3)_2$ and mixtures thereof.

22. The dual phase membrane according to claim 20, wherein the membrane has an operational temperature within a range of about 100° C. to about 500° C.

23. The dual phase membrane according to claim 20, wherein the oxide ion transport agent is present in the ion transport phase in an amount between about 1 to about 30 molar %.

24. A process to separate carbon from a feed gas, the process comprising:

(a) contacting a surface of the dual phase membrane according to claim 20 with a feed gas containing a gaseous species to be separated therefrom at an operational temperature within a range of 100° C. to 500° C. sufficient to render the ion transport phase molten; and (b) allowing the gaseous species to be transported through the molten ion transport phase to an opposite surface of the membrane.

25. The process according to claim 24, wherein the feed gas comprises a concentration of $CO_2$.

26. The process according to claim 24, which further comprises contacting the opposite surface of the membrane with a sweep gas.

27. The process according to claim 26, wherein the sweep gas is steam.

28. The process according to claim 27, wherein the steam sweep gas results in a $CO_2$ concentration in the steam sweep gas exiting the membrane that is greater than a concentration of $CO_2$ in the feed gas.

\* \* \* \* \*